Aug. 29, 1967 — M. SPINKA — 3,339,059
ELECTRICALLY HEATED SWEATING TOOL
Filed Aug. 14, 1964
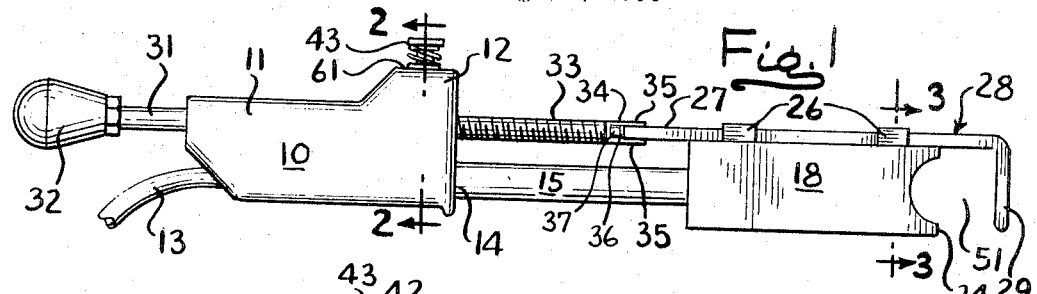
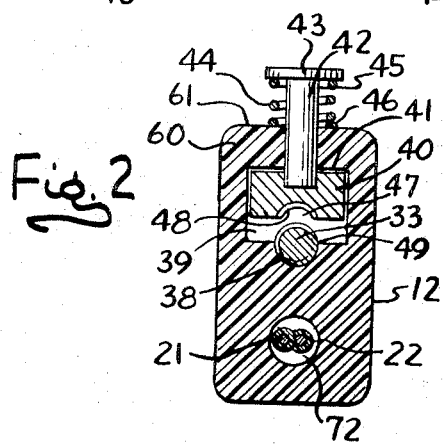
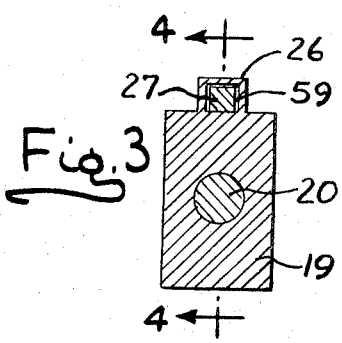
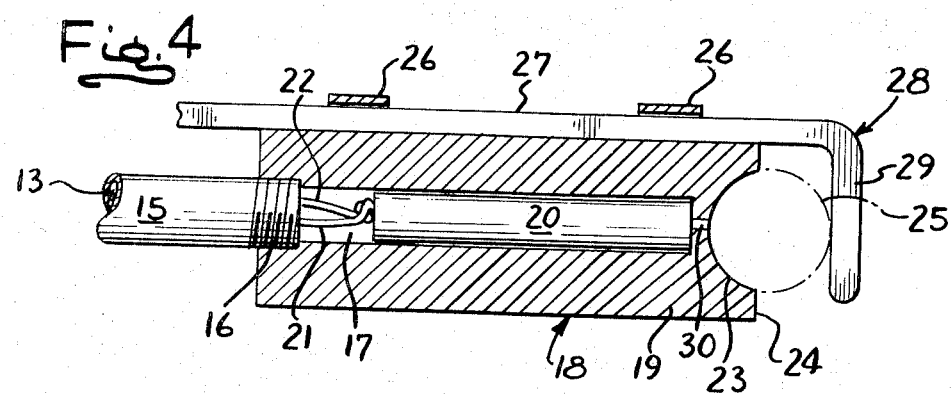
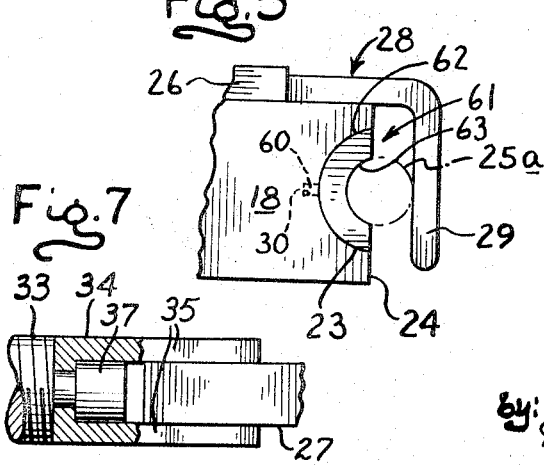
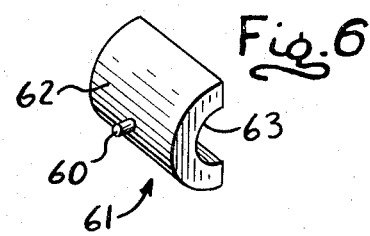
INVENTOR
MILTON SPINKA
ATTYS.

United States Patent Office 3,339,059
Patented Aug. 29, 1967

3,339,059
ELECTRICALLY HEATED SWEATING TOOL
Milton Spinka, 1224 Blanchan Ave.,
La Grange Park, Ill. 60525
Filed Aug. 14, 1964, Ser. No. 389,757
1 Claim. (Cl. 219—243)

The instant invention relates to sweating tools and the like. Particularly the invention relates to a sweating tool which is adapted to be releasably secured about a joint to be sweated.

Sweating is a process by which solder or like metallic materials having low melting points are heated to a flowable state and then run between adjoining metal surfaces to unite them. Sweating has particularly application in construction for connection of sections of tubes or conduits or the like in joints which will not permit leakage of fluid being conveyed by such joined together sections. Examples of common conduits which require sweating are as follows: gas pipes, water pipes, copper plumbing tubing and others which are adapted to convey various fluids from one place to another.

Conventional sweating tools include devices such as electric soldering irons, for examle, which are of relatively limited utility in most construction, and more often torches which can apply high heat rapidly.

A conventional electric soldering device must be continuously held by its operator who applies the point or tapered tip to solid solder placed or held adjacent to a joint to be connected until the same runs between the joint surfaces. The shape of conventional soldering irons is relatively inefficient for sweating conduits or tubing found in general construction. Furthermore, because the heat required to melt solder with a conventional iron is generally applied at a point, the length of time required to melt the solder is generally more than that which is profitably spent in view of the availability of rapid heat applicators such as, for example, torches.

However, employment of a torch as a source of heat to melt the fusion metals presents hazards which are related to the extremely high heats caused by the burning of fuel for th torch; and although the solder or the fusion metal melts rapidly and flows quickly between surfaces to be joined, accidental damage by burning or charring to structures of wood fabrication, for example, which frequently are adjacent to the conduit being sweated, is difficult to avoid. Furthermore, in employing a torch for reducing the fusion metal to a flowable state, it is necessary that at least one hand of the operator be engaged in holding the torch.

In accordance with the instance invention and as the primary object thereof, there is provided an improved tool of the described class which is adapted to connect or join together metal pipe tube and other conduit sections by sweating.

A feature of the improved device is that it is adapted for rigid securance about joints to be fused or sweated, by being clamped thereto. Such facility relieves both hands of an operator for placing and directing the flow of fusion metals whereby more efficient application thereof can be made.

An additional and further feature of the invention resides in the provision of a thermal or heat applying section which is adapted to seat the joint of a pair of fitted or placed together pipe or tube sections, and which is characterized by an extensible and retractable jaw to release and impinge pipe or tube sections to be sealed together.

The invention is further characterized by a mechanism adapted to rapidly release the jaw and accordingly the pipe sections held by the tool, and to aggressively retract and hold said jaw in work impringed position whereby said tool is supported by the work piece.

These and other features, advantages and objects of the present invention will be more apparent upon consideration of the following description and appended claims, when considered in conjunction with the accompanying drawings wherein the same reference character or numeral refers to like or corresponding parts throughout the several views.

On the drawings:

FIG. 1 is a side elevational view of one embodiment of the invention.

FIG. 2 is a transverse sectional view taken on the line 2—2 of FIG. 1 and looking in the direction of the arrows.

FIG. 3 is a transverse sectional view taken substantially on the line 3—3 of FIG. 1 and looking in the direction of the arrows.

FIG. 4 is a longitudinal sectional view of the front portion of the embodiment shown in FIG. 1, taken substantially on the line 4—4 of FIG. 3 and looking in the direction of the arrows, a clamped tube section being shown in dotted lines.

FIG. 5 is an enlarged elevational view of the forward tip of the tool and shown holding a tube of smaller diameter than that shown in FIG. 4, and having the adapter of FIG. 6 in place.

FIG. 6 is a perspective view of an adapter for use with the tool to accommodate tubes having a smaller outside dimension.

FIG. 7 is a side elevational view partially in section, on an enlarged scale of a portion of said embodiment.

Referring now more particularly to the drawings, the tool comprises a handle 10. The handle 10 is fabricated from any suitable material such as Bakelite or other rigid plastic or the like. Handle 10 has a rear portion 11 and an integral forward portion 12, the vertical dimension of which, with respect to FIG. 1, is greater than that of the rear portion 11. The rear portion 11 of the handle 10 is adapted to be manually gripped during normal manipulation of the tool.

As illustrated in FIGS. 1 and 2, the handle 10 has a pair of bores 72 and 38. The lowermost bore 12 extends longitudinally of the handle 10 and accommodates an electric power cord 13, the outermost end portion of which (not shown) may terminate in a plug adapted to be connected to a power source.

What may be referred to as the rear end portion 14 of a tube, pipe or conduit 15 is rigidly secured in the forward end of bore 72, preferably by means of threads or the like (not shown), whereby said conduit 15 and bore 72 are coextensive and in axial alignment, with the cord 13 extending through said tube, pipe or conduit 15. As illustrated in FIG. 4, the forward end portion 16 of the tube, pipe or conduit 15, is mounted in the well or bore 17 provided in a thermal component, heating element or heater generally designated as 18.

The thermal component, heating element or heater 18 comprises a high heat conductive elongated casing 19. The casing 19 is preferably fabricated from a metal such as aluminum or copper or the like. Disposed within the bore or well 17 of casing 19 is an electrical resistance 20 which is electrically connected with the circuit wires 21 and 22 carried in the electrical cord 13. As illustrated in FIG. 3, the resistance 20 is snugly fitted into the forward end portion of the well 17 to facilitate the most efficient heat transfer from the resistance 20 to the casing 19.

The rearward end of the electrical resistance 20 is spaced longitudinally of the device from the end portion 16 of the conduit or pipe 15. The wires 22 and 21 bridge the space between the end portion 16 and the rearward portion 20 of the resistance 20, as illustrated in FIG. 4.

A semi-cylindrical concavity, seat or rest 23, is provided in the front end portion 24 of the casing 19. The longitudinal axis of said concavity, seat or rest 23, extends laterally or transversely of the tool with respect to the drawings. The radius of curvature of the concavity, seat or rest 23, is the same as the external diameter of the tubing or pipe which is the largest adapted to be accommodated by the tool. That is to say, by reference to FIG. 4, for example, the pipe 25 has the largest diameter which will be accommodated by the tool, as the external radius of curvature of said pipe or tube 25 is substantially the same as the radius of curvature of the concavity or seat 23. On the other hand, having reference to the pipe 25a in FIG. 5, it is seen that the external radius of curvature thereof is smaller than the radius of curvature of the concavity or seat 23, whereby it is necessary to employ an adapter such as shown in FIG. 6 to accommodate pipes, conduits or tubing of smaller external diameters.

Having reference now to FIGS. 1, 3, 4, and 5, it is seen that a pair of bosses 26 are rigidly secured in longitudinally spaced apart relation on the top of the casing 19. If desired, the bosses may be integral with the casing 19. The bosses are apertured as at 59, with such apertures 59 in alignment longitudinally of the tool. Thereby a track is provided to accommodate for retraction and extension the elongated arm portion 27 of an extensible and retractable clamping member generally designated by numeral 28.

As illustrated in FIG. 4, the arm portion 27 of the clamp member 28 is preferably rectangular in cross section, as are the apertures 59 in the bosses or guides 26. Thereby the arm section 27 is precluded from rotation and its movement is limited to extension from or retraction toward the front end 24 of the casing 19.

The clamp member 28 is provided with a depending or overhanging portion or jaw 29. The jaw 29 is disposed in front of the forward end 24 of the casing 19. By reason of means to be hereinafter described, the jaw 29 is movable either to the left or to the right with respect to FIGS. 1, 4, and 5, whereby the connected pipe, tubing or conduit sections of various diameters may be gripped and released from the seat or rest formed by the concavity 23.

A duct 30 extending longitudinally of the casing 19 and open at both ends, as illustrated in FIG. 4, communicatively connects the well 17 with the concavity 23. Duct or seat 30 is provided to accommodate the stem 60 of the adapter 61.

Previously identified bore 38 is disposed in the upper portion of the handle 10 and extends longitudinally of said handle. An elongated rod or lever 31 is disposed in said upper bore 38. At the rear or outer end portion thereof, the rod or lever 31 has mounted thereon a hand grip 32, as illustrated in FIG. 1. A medial portion 33 of the rod or lever 31 is preferably round in cross section and externally is threaded, as illustrated in FIGS. 1 and 2.

Threaded portion 33 extends longitudinally of the rod or lever 31 and is spaced as at 36 from arm portion 27. Threaded portion 33 at its forward end portion has a restricted portion which is journalled in a link or connector 34. The link or connector 34 has a pair of arms 35 which secured to the rear end section of the arm portion 27, as illustrated in FIG. 7. The link 34 is retained on the threaded portion 33 of rod 31 by an enlarged head 37 arranged at the forward end of rod 31. Thereby link 34 is free to rotate about the end portion 37 of arm section 27, as illustrated in FIG. 1. As illustrated in FIG. 1, arm section 27 and rod or lever 31 are co-extensive.

Bore 38 permits the rod 31 to be moved or slid longitudinally of the device to the right or the left with respect to FIG. 1. Within the enlarged handle portion 12 the bore 38 is enlarged to form a chamber 39 as illustrated in FIG. 2. The chamber is substantially rectangular in cross section and has in the bottom thereof a concavity which is semi-circular in cross section and which is a longitudinal extension of the bore 38.

A block or plug 40 is disposed in the chamber 39. Said block or plug 40 is normally urged or biased against the upper wall 41 of said chamber 39 by means of the following construction: A stem or plunger 42, the inner end of which is rigidly secured to said plug 40 by any suitable means, extends upwardly through the upper wall 60 of the enlarged portion 12 of the handle 10, as illustrated in FIG. 2. A cap 43 is rigidly secured or integral with the upper end of the stem or plunger 42. A compression or coil spring 44 is mounted about the stem with its opposite ends 45 and 46 bearing against the cap 43 and the top 61 of the housing portion 12, respectively, as illustrated in FIG. 2.

While the upper surface of the plug 40 is flat, the lower surface has therein provided an upwardly directed concavity 47 which is semi-circular in cross section. The longitional axis of said concavity 47 extends longitudinally of the handle 10.

Concavity 47 is threaded as at 48 with a thread which extends longitudinally of the tool. Thread 48 corresponds to the thread 49 on the screw portion 43 and is adapted to operably engage same. By pressing the plunger or stem 42 downwardly against the action of the spring 44, the threads 48 can be made to mesh with the threads 49. Upon turning of the handle 32 to retract the jaw 29 or move it to the left with respect to FIGS. 1, 4 and 5, to clamp an article seated in the seat or rest 23, sufficient tension can be created in the screw 33 to cause it to grip and hold the plug 40 down against the screw 33 with the spring 44 in compressed position. Once the article in seat or rest 23 is engaged by jaw 29, only a slight twist of handle 32 is required to develop the force required to hold the plug 40 in threaded engagement with screw 33.

By turning the screw in an opposite direction to drive it to the right with respect to FIGS. 1, 4, and 5, jaw 29 will disengage the article theretofore gripped, resulting in a corresponding release of torque or tension in the screw 33. Thereupon the force on the block or plug 40 is reduced and said block or plug 40 is returned to the position illustrated in FIG. 2 by action of spring 44.

Having thus described the details of construction of the invention, a brief description of the operation of the device, in review, now ensues:

It is appreciated that in many instances, perhaps most, the pipe, tube or conduit joint to be sealed will be in a fixed or permanent position. Therefore, in use, the tool is carried to the pipe, tube or conduit, and it is hooked about the joint to be sealed, with the held together pipe, tube or conduit sections then disposed in the space identified as 51 in FIG. 1, and seated in the rest, seat or concavity 23, as illustrated in FIGS. 4 and 5.

Initially the block or plug 40 is elevated in the position shown in FIG. 2 by action of spring 44. Thereby, the rod or lever 31 may be freely moved or slid to the right with respect to FIGS. 1, 4, and 5, without the requirement for threading screw 33 for such movement. Accordingly, the jaw 29 can be adequately and sufficiently quickly spaced from the front end portion 24 of casing 19 to permit easy disposition of the work to be connected against the front end of the tool in seat 23.

Once the tool is properly disposed against the heating member 18, jaw 29 is drawn back or retracted to engage the work. Thereafter, the cap 43 is manually depressed to drive threads 48 into mesh with thread 49 of the screw 33. Handle 32 is then rotated slightly to draw jaw 29 tightly against the work assembly held in the space 51. Thereby, sufficient or adequate torque or tension is developed in the screw 33 to hold the plug 40 downwardly against said screw, and clamp 28 is held closed on the work.

In such positions the tool has become anchored to the work and both hands of the operator are free to attend to manipulation of the solder or other low fusing metal which will be used for sweating.

When it is desired to release the tool for partial rotation around the joint or for complete removal from the sweated work, the hand grip 32 is rotated slightly to relieve the tension in screw 33 and to slightly extend the jaw 29. Once the extension is sufficient to relieve the tensionsion in the screw 33, block or plug 40 will no longer be gripped by the screw and said block or plug will rise upwardly out of engagement with said screw, under biasing of spring 44. Thereafter, disengagement of the jaw 29 can be accelerated merely by pushing the hand grip 32 to the right with respect to FIGS. 1, 4, and 5 as the screw 33 is not held by threads.

The adapter 61 is for the purpose of accommodating a smaller sized tube and fitting than the maximum size originally incorporated in the concavity 23 in the casing 19. A series of adapters may be provided wherein the radius of curvature of the seat 23 is always identical to the outside radius 62 of the adapters for snug engagement with the face of the seat 23. The inside radius of curvature of the adapters is equal to the outer diameter of the tube to which it is to be used. Since almost all tubes, pipes and fittings are standardized with regard to the outside diameter, no details regarding the pipe or tube sizes are deemed necessary to the full understanding of the inside radius of the adapters.

It should now be obvious that the stem 60 is designed to retain and orient the adapter in position when the stem is seated in the seat 30.

As many substitutions or changes could be made in the above described construction, and as many apparently widely different embodiments of the invention within the scope of the claim could be constructed without departing from the scope and spirit thereof, it is intended that all matter contained in the accompanying specification shall be interpreted as being illustrative and not in a limiting sense.

I claim:

A sweating tool and the like comprising
an elongated handle having therein a bore;
a metal melting member spaced from one end of said handle,
    said metal melting member providing a seat for a work piece on one end thereof;
a passaged tie connected to and connecting said handle and said metal melting member;
a threaded rod slidable longitudinally of said handle in said handle bore,
    said rod having a manually grippable end portion and an opposite end portion extended outwardly from said handle;
a torque translation link carried on the opposite end portion of said rod;
a track carried on the metal melting member;
an arm slidable in said track,
an inner end portion of said arm operably connected to said link;
a plug disposed in said bore and having a thread section arranged and proportioned for cooperation with the threads on said rod;
spring biased means connected to said plug for holding same disengaged from said threaded rod;
manual means for pushing said plug into threaded engagement with said rod, and
a jaw on the other end of portion of said arm and adapted to be moved upon threading extension of said rod to releasably impinge a work piece against an end of said metal melting member,
whereby the tension in said arm will cause said plug in rod engaged position to lock therewith to clamp said tool to the workpiece.

References Cited

UNITED STATES PATENTS

| | | | |
|---|---|---|---|
| 150,900 | 5/1874 | Silver et al. | 269—249 X |
| 444,484 | 1/1891 | Brown | 269—249 X |
| 933,318 | 9/1909 | Marshall | 228—51 X |
| 1,332,937 | 3/1920 | Van Viersen | 228—44 |
| 1,744,941 | 1/1930 | Wood | 219—243 |
| 1,804,007 | 5/1931 | Golnick | 269—249 X |
| 2,001,538 | 5/1935 | Mueller et al. | 219—535 X |
| 2,470,854 | 5/1949 | Kovac | 219—221 |
| 2,647,557 | 8/1953 | Selvin | 156—579 |
| 2,671,482 | 3/1954 | Gordon | 269—249 X |
| 3,080,469 | 3/1963 | Benoit | 219—231 |
| 3,219,336 | 11/1965 | Merriman | 269—249 X |

FOREIGN PATENTS

| | | |
|---|---|---|
| 480,374 | 2/1938 | Great Britain. |

ANTHONY BARTIS, *Primary Examiner.*